US006738797B1

(12) United States Patent
Martin

(10) Patent No.: US 6,738,797 B1
(45) Date of Patent: May 18, 2004

(54) SYSTEM AND METHOD FOR TRACKING RECORDS IN A DISTRIBUTED COMPUTING SYSTEM

(75) Inventor: Paul A Martin, Gt Bealings (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/381,729

(22) PCT Filed: Mar. 26, 1998

(86) PCT No.: PCT/GB98/00922

§ 371 (c)(1),
(2), (4) Date: Sep. 24, 1999

(87) PCT Pub. No.: WO98/44413

PCT Pub. Date: Oct. 8, 1998

(30) Foreign Application Priority Data

Mar. 27, 1997 (GB) .............................................. 9706400

(51) Int. Cl.[7] .......................... G06F 17/30; H04L 12/24
(52) U.S. Cl. ...................... 709/201; 707/10; 707/104.1; 379/9.04; 379/114.03
(58) Field of Search ................................ 709/200, 217, 709/205, 201, 223; 379/9.04, 9.06, 14, 112.01, 114.01, 114.03; 707/104.1, 10

(56) References Cited

U.S. PATENT DOCUMENTS

| | | | | | |
|---|---|---|---|---|---|
| 5,396,630 A | * | 3/1995 | Banda et al. | ................ | 395/700 |
| 5,778,354 A | * | 7/1998 | Leslie et al. | .................... | 707/2 |
| 5,835,757 A | * | 11/1998 | Oulid-Aissa et al. | ........ | 395/610 |
| 5,905,984 A | * | 5/1999 | Thorsen | ........................... | 707/9 |
| 5,987,497 A | * | 11/1999 | Allgeier | ....................... | 709/201 |
| 6,023,721 A | * | 2/2000 | Cummings | .................. | 709/201 |

FOREIGN PATENT DOCUMENTS

| | | |
|---|---|---|
| CA | 2097540 A | 12/1994 |
| WO | WO 95 01605 A | 1/1995 |

OTHER PUBLICATIONS

Anonymous: "Hybrid Method for Locating Mobile Objects", IBM Technical Disclosure Bulletin, vol. 36, No. 6A, Jun. 1993, New York, US, pp. 381–382, XP000372464.
Patent Abstracts of Japan, vol. 097, No. 001, Jan. 31, 1997 & JP 08 249186 A (Nippon Telegr & AMP; Teleph Corp & LT;NTT>) Sep. 27, 1996.
Patent Abstracts of Japan, vol. 096, No. 004, Apr. 30 1996 & JP 07 319835 A (Matsushita Electric Ind Co Ltd), Dec. 8, 1995.
Katsumi Maruyama: Object–Oriented Switching Software Technology: IEICE Transactions on Communications, vol. E75–B, No. 10, Oct. 1, 1992, pp. 957–968, XP000324829.

* cited by examiner

Primary Examiner—Dung C. Dinh
(74) Attorney, Agent, or Firm—Nixon & Vanderhye PC

(57) ABSTRACT

A distributed computing system used for controlling a telecommunications network includes a number of computers interconnected by a data communications network each computer storing a plurality of data records. The computers are programmed to access records held on other computers and are programmed to move the record to another computer. Each computer is further arranged to store a table of data indicating the computer on which that record may currently be stored, and to update that table when the record is moved. Each computer is further programmed to store a log of the identities of the other computers which have accessed the record, and the computers are further programmed so that after moving the record, the computer sends a location updating message to at least one further computer determined in accordance with the log.

9 Claims, 11 Drawing Sheets

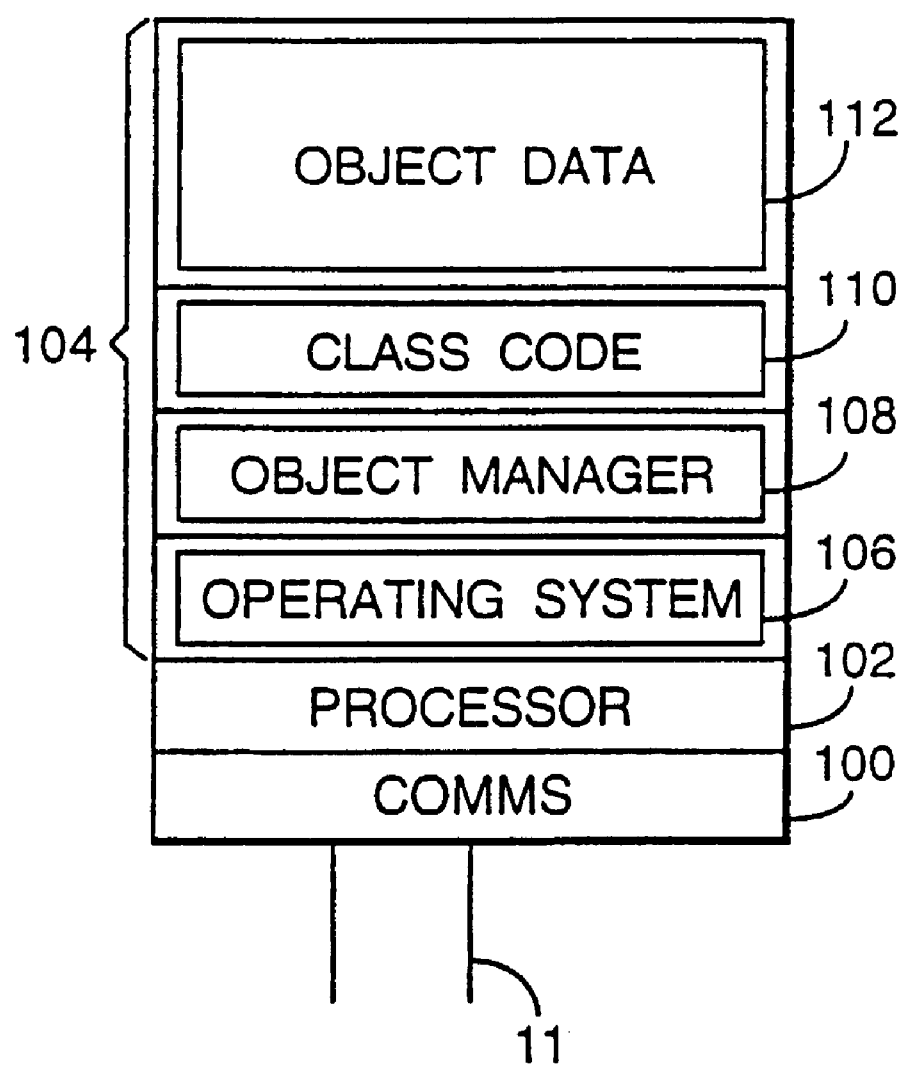

FIG. 4

| | 112 | 500 |
|---|---|---|
| 502 | CUSTOMER TYPE | "EMPLOYEE" |
| 504 | U ID | 71 |
| 506 | HOST | "132.146.12.105 |
| 508 | NORMAL NO. | "0171-111-1111" |
| 510 | REROUTE NO. | "0171-222-2222" |
| 512 | REROUTE TIMES | 0700-2100 |
| 514 | CALL LOG | (NO.) (DATE) (TIME) (COST) |
| | | ⋮ |
| | | ⋮ |
| | | ⋮ |

SYSTEM AND METHOD FOR TRACKING RECORDS IN A DISTRIBUTED COMPUTING SYSTEM

BACKGROUND OF THE INVENTION

This invention relates to a distributed computing system, and particularly but not exclusively to such a system used for control of a telecommunication network.

A distributed computing system for control of a telecommunications network is described in "Twenty-twenty vision—software architectures for intelligence in the 21st century", P. A. Martin, BT Technol J Vol 13 No. 2 April 1995, by the inventor of the present invention. Further inventions concerning such a system are disclosed in our earlier PCT applications WO 97/26595 and WO 97/26596. Additional inventive detail is disclosed in earlier PCT application GB 97/02606. All of the foregoing were invented by the present inventor and assigned to the present applicant, and all are incorporated herein by reference in their entirety.

Where a data record (such as an object comprising data accessible by associated codes stored in relation to the data) can be held on any of a number of different computers, one computer wishing to access such a record held on another needs to be able to determine which computer the object is held on. Where, additionally, objects may be moved from one computer to another (as in the above described systems) it is necessary to track the locations of the objects as they move.

Telecommunications networks are increasingly required to support high bandwidth, low delay information flow. The bandwidth required is rapidly progressing from kilobits per second to megabits per second and even, for some applications, gigabits per second (particularly, for example, for video on demand; animated shared simulations, and distributed computing).

To provide "intelligent network" facilitates such as call redirection to particular numbers, computer programs run on a number of host computers (up to 100, for example) connected with switching centres. The way in which services are to be provided for particular customers (for example, a particular number to which calls for a customer are to be routed) depends upon data stored in relation to that customer on the host computers. Thus, there may be many millions of subscriber records on tens or hundreds of host computers.

A description of object oriented technology will be found in, for example, BT Technol J Vol. 11 No. 3 (July 1993), "Object oriented technology", edited by E. L. Cusack and E. S. Cordingley. Although the term is not always used with precision, object oriented computing here refers to the computing technique in which data is stored in "encapsulated" form in which, rather than being directly accessible by a calling program or routine, the data is accessible only by a limited part of a program which can read, write and edit the data. A record of data and its associated computer code are referred to as an "object". Communication to and from an object is generally by "message passing"; that is, a call to the object passes data values and invokes the operation of one of the programs comprised within the object, which then returns data values.

Object oriented techniques have not widely been applied to distributed processing. A summary of the state of the art in this respect may be found in "Object oriented Languages, Systems and Applications"; Blair G. et al, Pitman Publishing, London, 1991 (ISBN 0-273-03132-5) and particularly in Chapter 9 at pages 223–243; "Distributed systems and objects"; David Hutchison and Jonathan Walpole.

It will be appreciated that in the control of telecommunications networks, where on the order of 100 million subscriber records and 100 Million terminal equipment records may be kept (in addition to records of each routing device, and other data such as billing records) the signalling overhead in tracking moving records may be substantial.

One solution might be to provide a single, central object location database. However, where large numbers of objects and accessing computers are provided, as is the case in the control of telecommunications networks, this would provide a signalling bottleneck.

Another solution might be to issue broadcast requests to access objects. However, again, this can lead to contention and bottlenecking.

SUMMARY OF THE INVENTION

In the above mentioned applications it is proposed to provide, in every host computer within the network, a table storing the locations of every object in the network. The table comprises, for each object, the name of the object; the computer on which the object current resides; and the computer on which the object was created.

After an object is moved, a message is sent to all other host computers, which correspondingly update their location tables. If any host computer has an out-of-date table, so that the location stored is not current, it is able to request the identity of the object from the host computer on which it was created, which is then able to refer to the computer to which the object has moved.

This proposal has the advantage that any computer usually needs only access its local table to determine where any object is stored. The present invention also makes use of this principle.

However, a first disadvantage with the arrangement described is that it may involve a substantial volume of storage within memory, since for each object, the object name and the identities of two computers are stored.

With a very large number of objects, the amount of storage required may be too large to be accommodated within a single Unix™ process, for example. If this is the case, then not only is the volume of storage large, but the access time may also be increased.

Accordingly, in one aspect, the present invention improves upon that arrangement by providing that each newly created object is allocated a name which indicates the host computer on which it was created. With this arrangement, it is possible to simplify the location table stored at each computer in two respects; firstly, by eliminating the need for storage of the identity of the host computer on which each object was created, and secondly, by being able to partition the table into spaces for each host computer which make it possible to dispense with the need to store the object name.

In an embodiment, therefore, where no more than 255 host computers are provided, it has been found possible to store the location record for each object within one byte, so that location data for 100 million records can be stored within 100 Megabytes, enabling the table within each host computer readily to be stored within the working RAM for a process.

Another limitation of the arrangement described in our earlier patent applications is that the signalling which takes place to update the position of an object is broadcast in nature; that is, the update position is transmitted to all further host computers when an object is either moved or created.

In another aspect, the present invention provides that each computer logs the accessing of each object by other computers, so as to build up information on which other computers commonly access each object. This information is utilised after moving an object, to ensure that those other computers which use the object are informed.

In one case, only those other computers which have accessed an object are informed, which leads to a reduction in the volume of signalling over the network.

In another embodiment, the computers logged as accessing an object are informed either earlier or more often than others, thus achieving either a lower signalling overhead, or a greater reliability in signalling to those computers for which it is more important to have knowledge of the object's position, and a lower volume of processing to be performed by each computer, since computers are not always required to perform location updating on those objects which they never access.

For example, the computers logged as accessing an object may be informed on, or shortly after, a move of the object occurs, and then all computers may be informed, on a periodic basis, of all object changes which have occurred, by multicasting a message to all the computers indicating a plurality of object moves. Since a single message to each computer carries a plurality of object move data, the signalling overheard is reduced as separate address headers are not required for each item of object move data (as would be the case if each object move were signalled to all computers after it occurred).

BRIEF DESCRIPTION OF THE DRAWINGS

Many other aspects and preferred embodiment of the invention will be apparent from the following description and claims.

Embodiments of the invention will now be illustrated, by way of example only, with reference to the accompanying drawings in which:

FIG. 2 is a block diagram illustrating the elements of a host computer forming part of the system of FIG. 1;

FIG. 4 illustrates the data structure within memory of one component of FIG. 3a;

GENERAL SYSTEM DESCRIPTION

Figure 1:
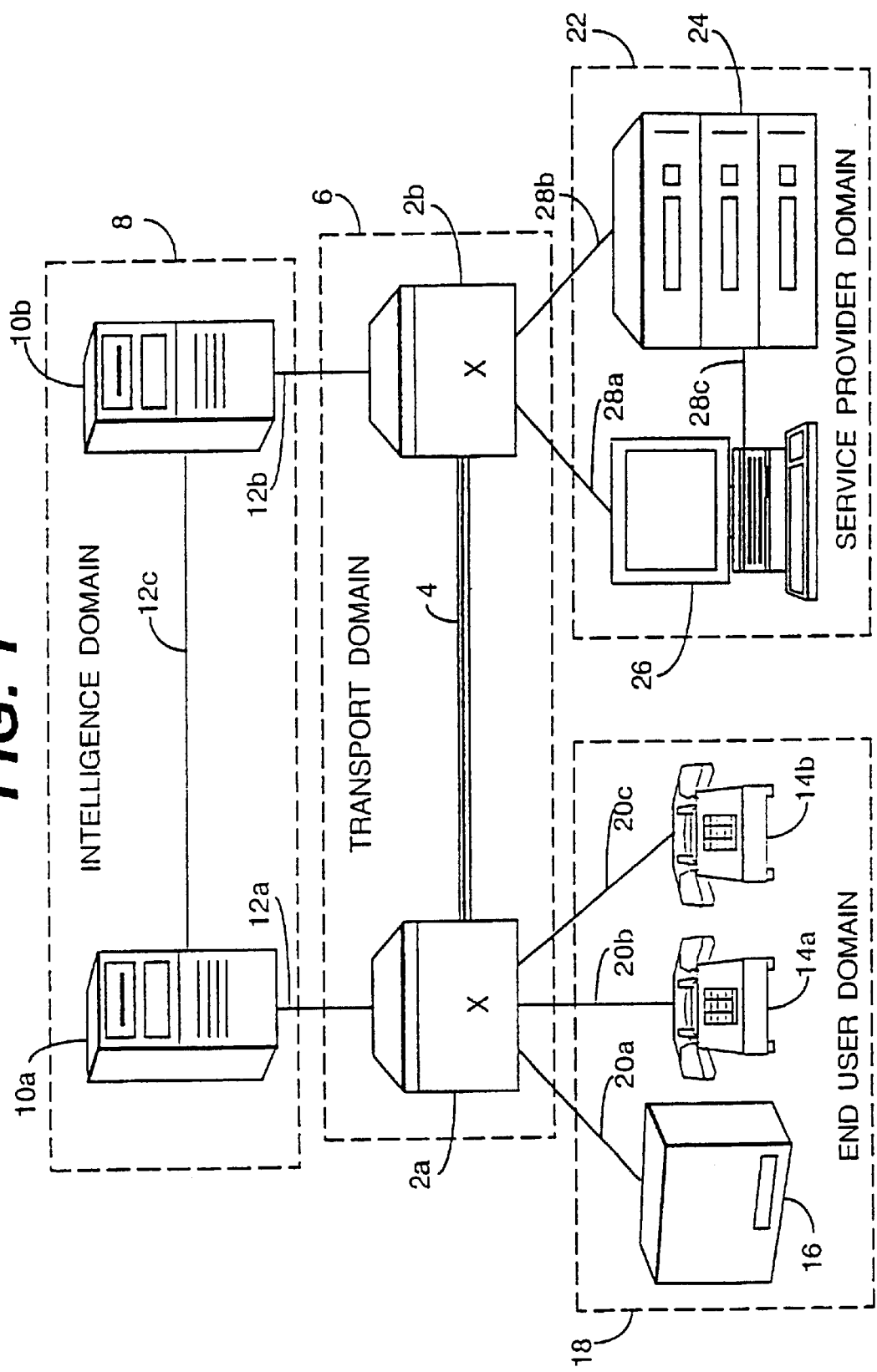
FIG. 1 is a block diagram illustrating the elements of a telecommunications system embodying the invention.

Referring to FIG. 1, a telecommunications system produced according to the invention comprises a plurality of switching centres or exchanges 2a, 2b interconnected by communications channels 4 (e.g. microwave links, fibre-optic cables, coaxial copper cable or virtual circuits carried on any of the foregoing) making up a transport domain 6. Connected to the transport domain 6 is an intelligence domain 8 comprising a plurality of host computers 10a, 10b in signalling communication with the switch centres 2a, 2b via signalling links 12a, 12b, 12c which also interconnect the host computers 10a, 10b. For example, the two may be interconnected using protocols such as signalling system 7 (SS7).

End user apparatus such as telephones 14a, 14b and broad bandwidth communication devices such as video players 16, jointly comprise an end user domain 18 connected to the transport domain 6 via local loop connections 20a, 20b, 20c (for example optic fibre, cellular radio or twisted pair copper cable links).

Further provided is a service provider domain 22 consisting of equipment for providing services (for example video services), such as a video player 24 and a computer terminal 26, connected with the transport domain 6 via local loop connections 28a, 28b, 28c such as ISDN channels or other high bandwidth links.

In known fashion, an end user terminal 14 or 16 is used to pass a request, via the transport domain 6 to the service provider domain 22. As a result, a channel is set up through the transport domain 6 and the service provider domain 22 transmits a service via the channel to the end user domain 18 (for example by transmitting a real time video film, or a file of data in electronic format).

In conventional plain old telephone services (POTS), the transport domain 6 is controlled simply by the dialled numbers generated in the end user domain to set up the transport path. However, currently, "intelligent network" control of the transport domain is provided by the intelligence domain 8. The intelligence domain 8 receives from the transport domain 6 the dialled number and/or the dialling number, and performs some call processing in accordance with either the dialled or the dialling number, or both. The intelligence domain typically provides number translation services, where a dialled phone number is translated to provide a call forwarding service to another number. In this case, the dialled number corresponds to a stored record on one of the host computers 10, which is accessed in response to a signal on one of the links 12, to generate a corresponding redirection number.

In general, in response to the occurrence of an event in the transport domain 6 (such as the initiation of a call from the end user domain 18) the intelligence domain supplies control information to control the transport domain 6.

Other data is also stored within the intelligence domain. In this embodiment, billing data for each call is stored in the intelligence domain, to enable periodic billing of each customer.

Referring to FIG. 2, each host computer 10 comprises a mainframe or server comprising communications hardware 100 connected via a WAN or the Internet to the servers 11; a processor 102; and storage 104, comprising both rapid access storage in the form of random access memory and offline storage in the form of magnetic or optical disc drives.

Stored within the storage apparatus 104 are an operating system 106 (e.g. UNIX (TM)); an object manager program 108; and an object model comprising class code 110 and object data, all of which will be discussed in greater detail below.

Data Model Description

The data model employed within the intelligence domain will now briefly be described. In the following, each "object" is a data record comprising a number of fields of data, which is accessed only by code which corresponds to that object (in a one to many relationship, in the sense that the same code which relates to a class of objects actually accesses all objects of that class).

As is conventional, objects are grouped into classes, the objects of the same class containing different data but in the same format. Each object is associated also with one or more subroutines (generally termed "methods" or "functions") which operate on the data, and which generally constitute the only means of doing so.

The formats in which the subroutines associated with different objects of the same class will receive and return corresponding data are the same (i.e. all objects of the same class have a common interface). In fact, in C++ the subroutines are only represented once for all objects of the same class (i.e. the code for the sub routines is only stored once) so that the code and the objects are in a one to many relationship. The code is therefore associated with the class of the objects rather than with each object.

Each class of object may be a subdivision of a more generic class, as is conventional in object oriented programming. In this case, the code may be stored instead in relation to the more generic class (the "superclass"). The object manager 108 contains a list of the locations of the data making up each object, and on each invocation of (i.e. call to), an object, the object manager accesses the relevant subroutine code within the class code storage area 110 and supplies to the code the address of the data for the relevant object within the object storage area 112.

Figure 3A:
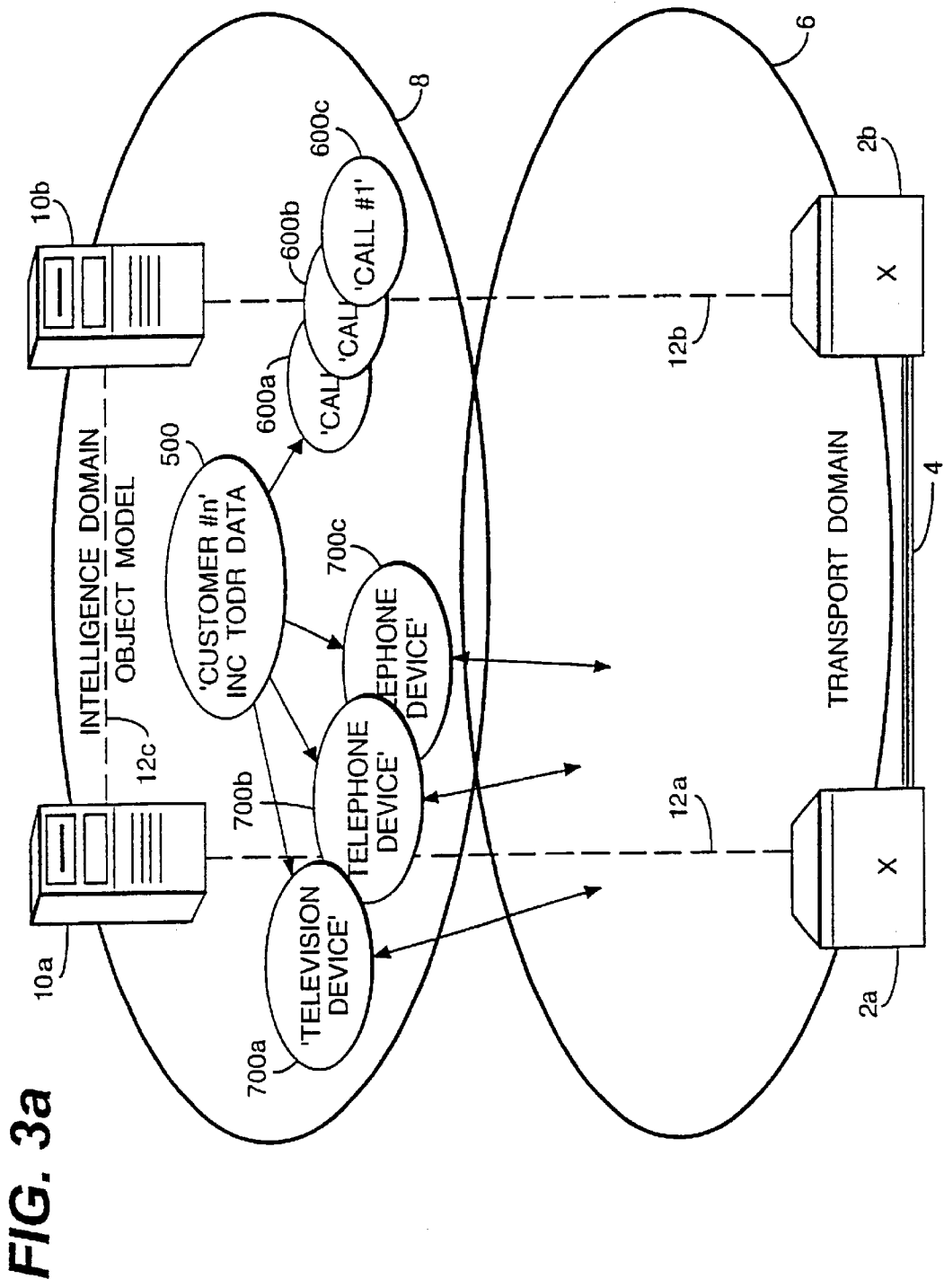
FIG. 3a is a diagram representing the structure of data held within the intelligence domain forming part of FIG. 1.

Referring to FIG. 3a, in this embodiment the objects provided within the hosts 10 of the intelligence domain comprise a plurality of customer objects 500 (one holding data relating to each of tens of millions of customers) which are created on the accession of a new customer; destroyed when the customer voluntarily departs or is cut off from the network; and edited when a customer's requirements change: a plurality of call objects 600a–600c which are created at the outset of call and destroyed after the termination of the call; and a plurality of communication device objects 700a–700c which each relate to an item of customer terminal equipment, and are created on first connection of that customer terminal equipment to the network.

Figure 3B:
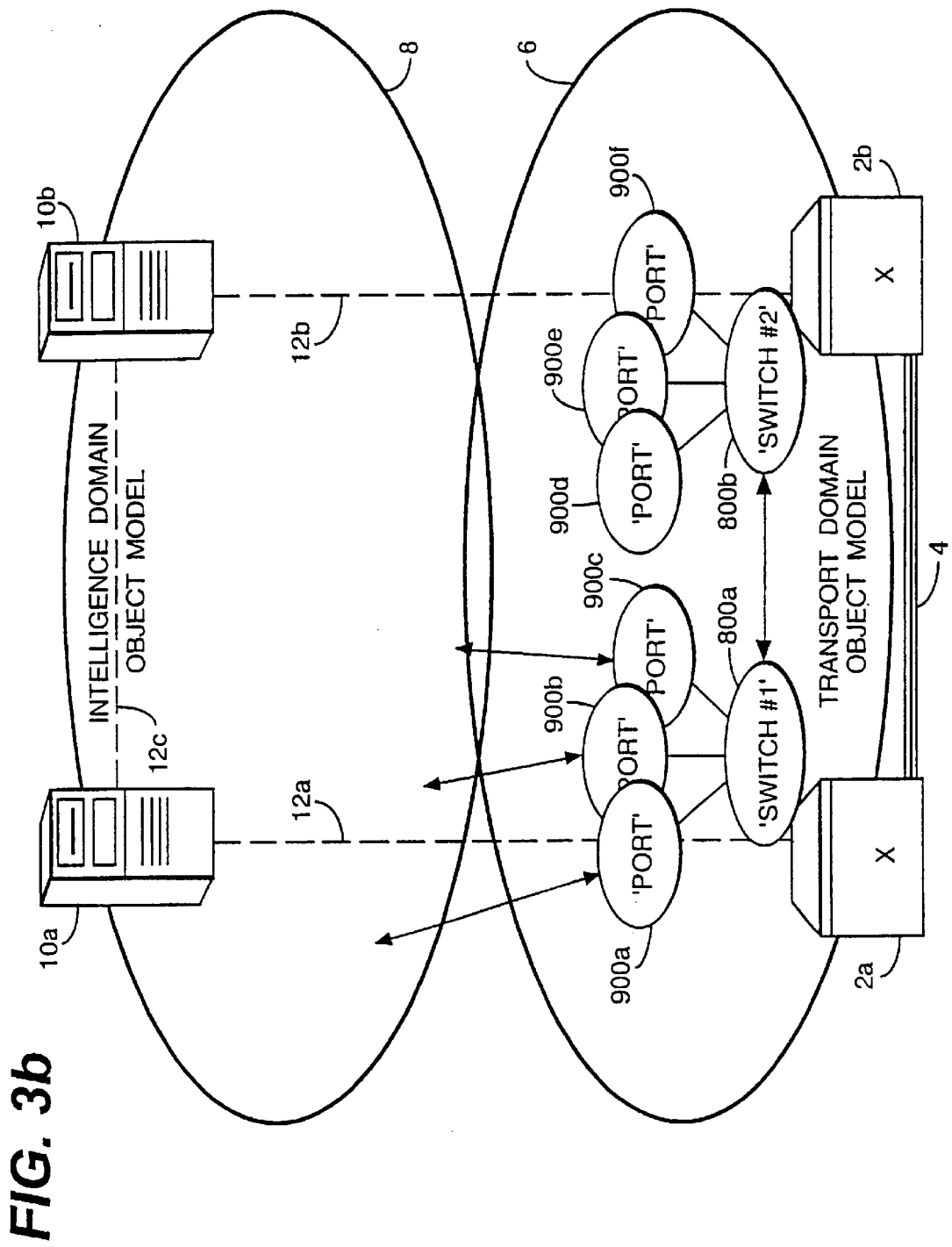
FIG. 3b is a diagram representing the structure of data held within the transport domain forming part of FIG. 1.

Referring to FIG. 3b, in this embodiment the switching centres 2a, 2b . . . of the transport domain 6 further comprise host computers on which are stored objects 800a–800b, 900a–900f which represent, respectively, the switches and the ports of the switches within the switching centres. Thus, each switch object 800 contains a record of the state of the corresponding switch at any moment; these objects exist permanently in memory and have a one to one mapping to the physical devices present in the switching centres 2, so that writing to the port or switch objects changes the state of the respective ports or switches, and reading the port or switch objects gives an accurate reflection of the actual condition of the corresponding physical devices.

Example of Object Data

By way of example, the structure of data within a customer object is illustrated in FIG. 4.

The attribute data maintained by the object 500 comprises a customer type field 502 (which may indicate that the customer is an employee or some other unusual status, or is a normal customer); a unique ID field 504; and a host field 506 indicating the host 10 on which the object 500 was created.

Also stored is data relevant to the services provided to the customer; for example, the normal telephone number of the customer(field 508); a telephone number to which the customers calls are to be re-routed at particular times of day (field 510); and the times of day during which calls are to be re-routed (field 512).

Finally, billing information for the customer is stored, in the form of a call log field 514 storing, for each call, the called (and/or calling) telephone number, the date and time of the call, and the cost of the call (field 514).

Different parts of this information need to be accessed by different individuals. For example, the fields 508–512 which define the service to be offered to the customer may be edited by customer service personnel or by the customer himself via an end user terminal 15, whereas billing data (field 514) should be writable only by the billing and accounting personnel operating the network. Certainly, no customer should be able to re-write his billing records from an end user terminal 15.

In operation, the occurrence of events in the transport domain (such as the monitoring of an "off hook" condition within the end user domain) invokes the operation of the code associated with an object in the intelligence domain. For example, on a telephone going off hook in the end user domain, the code to create a new "call" object 600 is invoked. When the called number is detected, it is transmitted via the signalling links 12 to the intelligence domain 8; the customer object 500 of the calling party is activated to amend the billing record field thereof; and the customer object 500 of the called party is accessed to determine the number to which the call should be forwarded, which information is then transmitted to the switch objects 800 within the transport domain to set up the path over which the call will be carried.

During the passage of a call, the role of the intelligence domain is usually limited. On clearing down a call on detection of the on hook event, the billing function code associated with the customer object(s) 500 updates the billing data field, and the call object is deleted by the object manager 108.

Description of Host Computer 10

Within each host processor 10, the object manager program 108 (the "daemon") comprises, as will be described in greater detail, processes for creating new objects; processes for determining the location (i.e. the host computer 10) on which given objects are stored; processes for sending messages to remote host computers; and processes for receiving messages therefrom.

Naming New Objects

Figure 5:
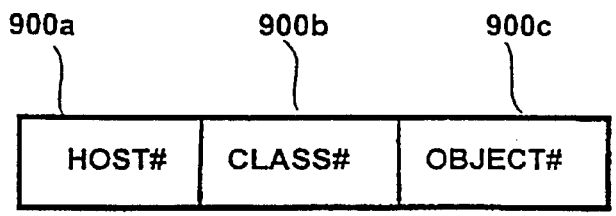
FIG. 5 illustrates the structure of a data record name.

When a new object is created, as is discussed in greater detail in our earlier application number WO 97/26596, it is allocated a name of the form shown in FIG. 5, consisting of a host computer identifier number 900a; a class identifier 900b; and an object number 900c. In this embodiment, the host identifier 900a consists of a number uniquely associated with one of the host computers 10; it is envisaged that in this embodiment there will be on the order of 255 such host computers and hence the host identifier 900a comprises an eight bit number.

The class identifier likewise comprises a number; in the present application, there may be on the order of several hundred classes and hence the class number 900b may likewise be a one byte number. Finally, an object number 900c is allocated representing the next available number of objects of the class concerned. There will be a maximum number of objects for each class; as indicated above, for customers, this may be on the order of 10 or 100 million objects.

Figure 6:
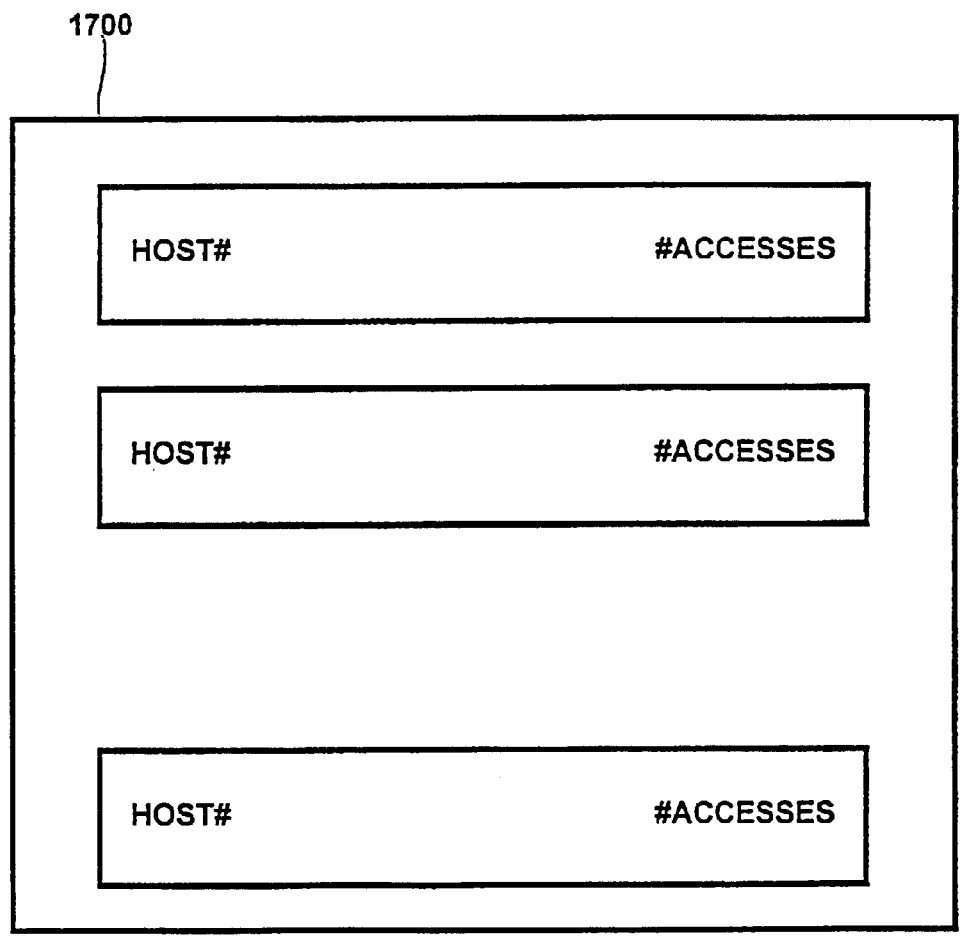
FIG. 6 illustrates structure of a table held within the computer of FIG. 2.

Referring to FIG. 6 each host computer 10 stores a table 1700 including an entry for each object actually held on the host computer, comprising an entry for each other host computer which calls that object, the entry recording the number of such calls within a predetermined time period.

Figure 7:
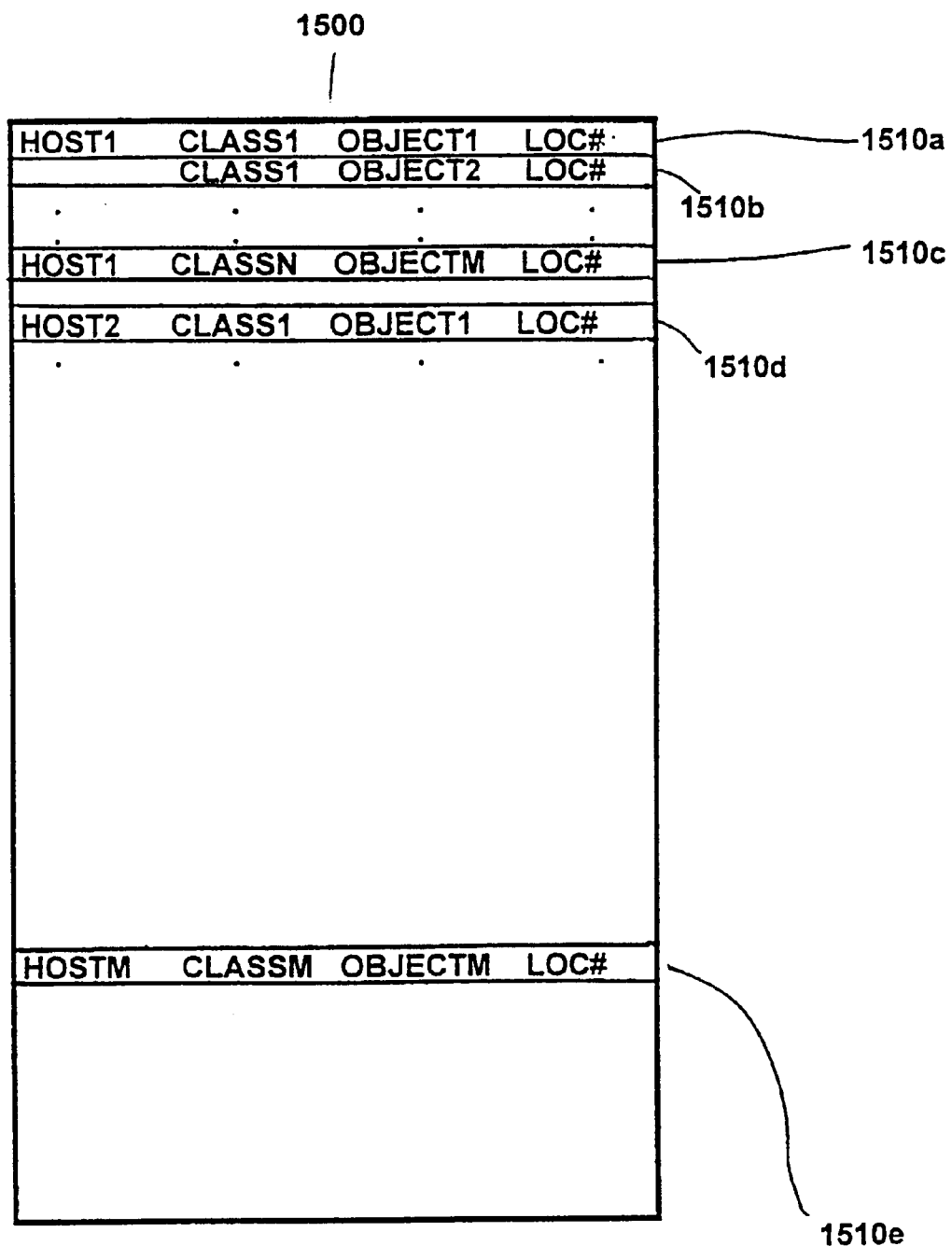
FIG. 7 illustrates the structure of an object location table held within the host computer of FIG. 2.

Referring to FIG. 7, the object manager 108 for each host computer 10 comprises an object location table 1500 storing a record 1510a–1510z for each object in the system, storing the host computer 10 on which the object is currently stored.

The record in table 1500 for each object simply consists, therefore, of an eight bit number identifying the number of the host computer where the object resides. This eight bit (one byte) number is mapped onto the IP address of the host computer by a small look up table (not shown here) within the host computer 10.

The table 1500 may conveniently be arranged with the object numbers running successively within each class, and with the classes running successively, for each host computer. Preferably, the maximum number of objects anticipated for each class is passed to the host computer 10 during compilation, as disclosed in our earlier application WO 97/26595. The table 1500 is therefore dimensioned in accordance with the maximum numbers of objects for each class for each host computer.

Because each object name specifies its host computer, class and object number, a host computer 10 can access the location within the table 1500 for the object directly from its name, without needing to store or look up an object name. Furthermore, since the name of the host on which the object was constructed forms part of the name, it is unnecessary for any host computers 10 to store or look up this information.

Object Movement

Objects reside on a given host but may be moved from one host to another (i.e. deleted from the storage of one host and included in the storage memory of another).

Figure 8:
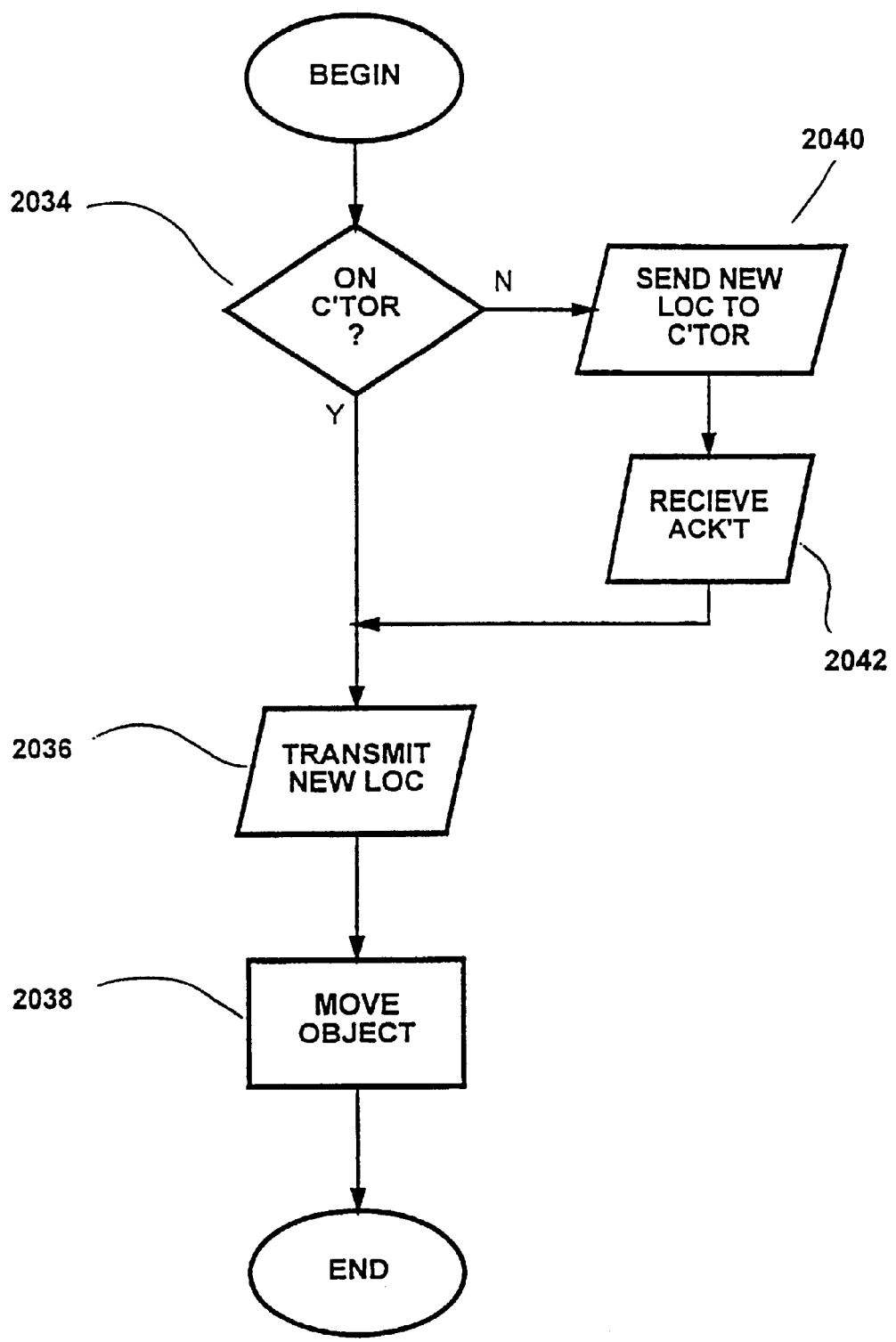
FIG. 8 is a flow diagram showing the general process of moving a data record.

Referring to FIG. 8. where the object manager program 108 determines that an object is to be moved from the host computer 10 on which the object manager 108 is resident (for example if that host computer 10 is running out of available memory), in a step 2034. the object name is reviewed to determine whether the object is currently residing on the host on which it was created. If so, (i.e. if the object has not moved since it was created) then in a step 2036, a new host is selected and its identity transmitted (as described below) and in a step 2038, the object is moved.

Step 2038 comprises two components; firstly a message is transmitted to the new host instructing the creation of the object at that host and specifying the values of data stored within the object; and secondly, the object is deleted from memory on the current host computer 10. Further details are described in WO 98/13758, incorporated herein by reference.

If in step 2034 it is determined that the object is not currently resident on the host computer 10 on which it was created (i.e. the object has already moved since it was created), in a step 2040 the object manager sends a message with this new host location to the original host computer 10 on which the object was originally created (as determined from the object name) and, after receiving an acknowledgement from that original host computer in step 2042, proceeds as described above (step 2036).

Object Location Tracking

Referring to FIG. 9, the use of the object location table 1500 will now be described in greater detail.

Figure 10:
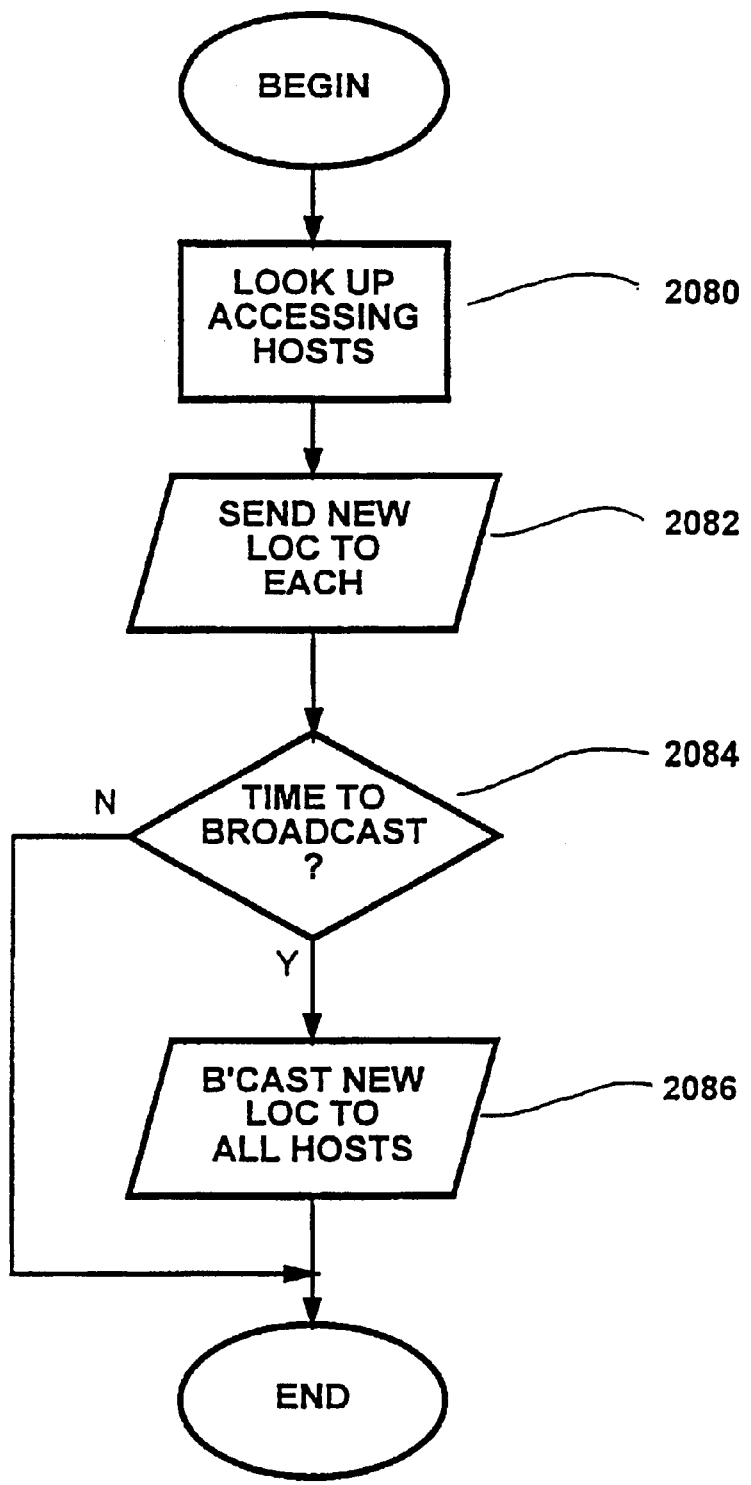
FIG. 10 is a flow diagram showing in greater detail part of the process of FIG. 8.

In the present embodiment, in step 2036, rather than broadcasting the new host address to all other host computers 10, the host computer 10 performs the process of FIG. 10. In step 2080, the host computer 10 reviews the table 1700 to determine which other host computers (if any) have accessed the object, and sends the new location to each of these in step 2080.

In step 2084, the host computer 10 determines whether a status update broadcast should be performed (for example, this may occur daily) and, if not, the process of FIG. 10 ends with only those host computers identified as having accessed the object recently being notified of the change of object location.

Where a broadcast is to be performed (step 2084) then in step 2086, the host computer 10 broadcasts a message indicating all object movements which have taken place since the last broadcast, to all host computers.

The message to each computer indicates the address of the computer (for example the IP address) and the list of objects which have moved since the last broadcast, together with their new addresses.

The broadcasts may be timed to coincide with periods of low network usage; for example, if daily, they could take place overnight.

Thus, in this embodiment, object movement information is transmitted immediately to those host computers which are likely to need it and periodically to all others, so that the processing overhead in updating object positions is constrained.

Where, as a result of this, a location table 1500 in another host computer is out of date, that host computer can access the constructor host for the object concerned, which will have the up-to-date location of the object.

Thus, normally, only a single look up step performed on the local host computer is required to identify an object or, at most, two look up steps, one to the constructor host, will be required.

When a message is to be sent to an object, in a first step 2046, the host 10 determines whether the entry in the table 1500 corresponding to the object name contains a location (step 2044); if not, indicating that this object has not previously been encountered, then in step 2046, the host computer 10 stores the constructor host address (determined from the name of the object) as the location host entry within the table in step 2046. The host computer 10 then treats the constructor host address as the location, and proceeds to step 2050. If in step 2046 the entry in table 1500 contains a current location, initially the object manager 108 determines the current host processor 10, on which the object is recorded as being located, within the object location table 1500, and sends a message, calling the object, to that current host in a step 2050.

In most instances, messages will reach the correct hosts, but it is possible that the object location table 1500 may not be completely up to date, so that the called object is not (or is no longer) on the indicated host computer.

Figure 9A:
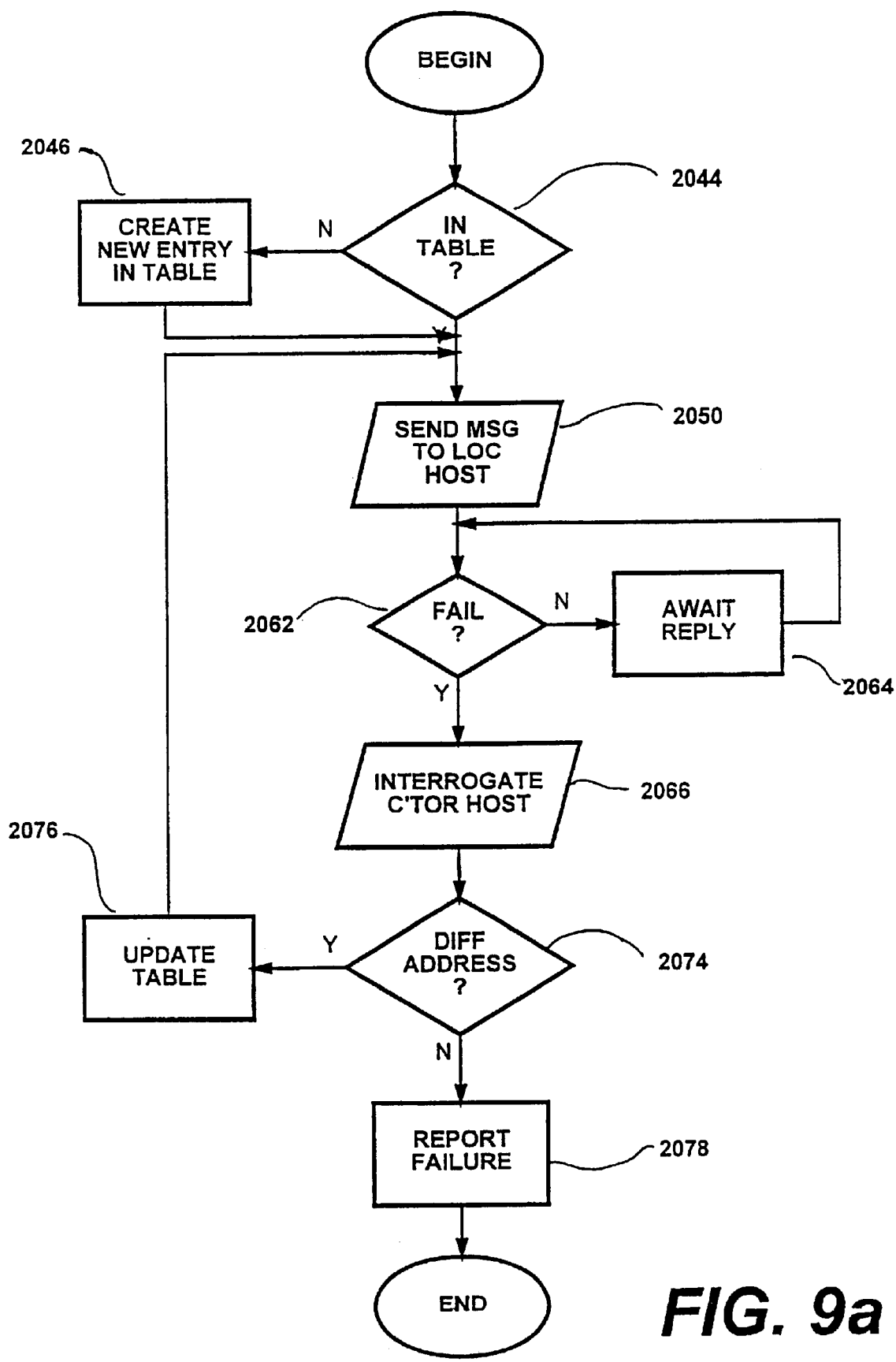
FIG. 9 (comprising FIGS. 9a, 9b and 9c) is a flow diagram showing the process of transmitting a message to a record on a remote host computer.
Figure 9B:
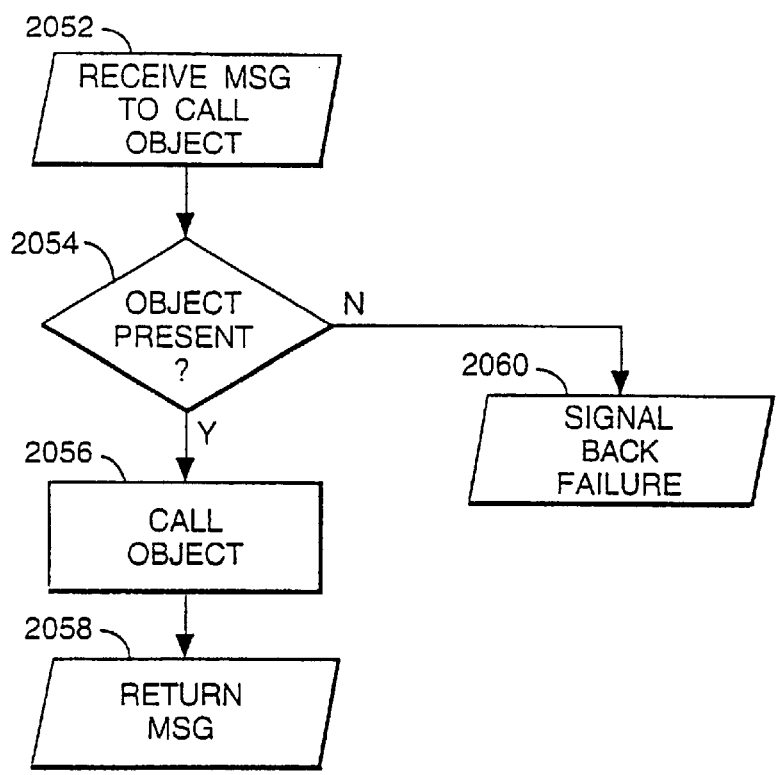

Referring to FIG. 9b, when the host computer 10 to which the message is addressed receives the message in a step 2052, it determines whether or not the object is recorded as being present within its own object location table 1500 in a step 2054. If present, the object is called in a step 2056 and any return message is transmitted back in step 2058, as described above.

If not, then in a step 2060, the host computer signals back a failure to call the object.

The originating host computer, on receiving such a message in a step 2062, then sends an interrogation message to the original host computer 10 which is recorded in the object name as being that on which the object in question was originally constructed, in a step 2066. The object location table 1500 on the original host on which the object was constructed should be fully up to date in respect of that object.

Figure 9C:
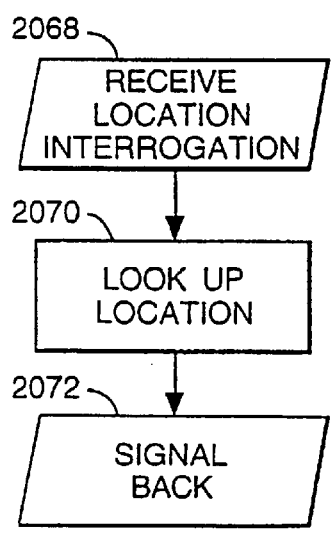

Referring to FIG. 9c, when the original host computer receives, in step 2068, a location interrogation signal the object manager 108 thereof refers to the object location table comprised within it in a step 2070, and signals back the determined location of the object concerned in a step 2072.

The calling host computer receives the location signal from the original host and determines, in a step 2074 of FIG. 9a, whether the host computer thus indicated as the location of the object differs from that to which a message for the object has already been directed in step 2050. If so, the object manager 108 updates the location table 1500 in a step 2076, and returns to step 2050 to repeat transmission of the message to the newly indicated host computer 10 location for the object.

If the address received is the same as the address to which the message was previously directed, in a step 2078 the object manager program 108 returns a message indicating a failure to reach the object to the object, process or user from whence the attempt to call the object originated.

It will thus be seen that, in this embodiment, each host computer 10 carries an object location table in which the location of all objects in the system is recorded, and each host is therefore able to operate autonomously, without reference to the central database, to call other objects on different host computers. Nonetheless, a higher level of integrity is added by providing that each host computer 10 additionally keeps track of the locations of all objects which were originally created on that host computer, even if the location of those objects subsequently moves to a different host computer.

Furthermore, it will be apparent that each host computer 10 maintains accurate records of those objects which are located within its own storage area.

It will be apparent that, by way of contrast with systems which update all computers with new location data for objects after each object move, the present invention provides economy in signalling and processing, without great loss of accuracy. The use of periodic broadcasts carrying multiple object moves reduces the volume of data signalled, since a single composite message is provided including multiple object movements, and therefore requiring only a single set of overhead or header data such as address data for multiple object moves, rather than separate header data for each object move. Secondly, where particular objects may very frequently move, between broadcasting times, the network is not occupied signalling each of these moves to all computers which may never access that object.

At the same time since those computers which are logged as accessing a particular object are informed immediately on a move, the likelihood of retaining an incorrect object location is substantially reduced. Further, since each object name includes a reference to its creator host computer, and this host computer is updated on every object move, any other host computer wishing to access that object will be able to do so by referring to the creator host computer for the object.

Other variations are of course possible. For example, the frequency of the update broadcasts may be varied depending on prevailing network traffic conditions or other parameters. Furthermore, different groups of computers may be updated at different periodicity; if, for example, slower, or more distant, computers are present these may be updated less frequently than others. In this case, the term "broadcast" in the foregoing will be understood to refer to a transmission to multiple computers but not necessarily to all computers.

A single computer (which may or may not form one of the host computers) may be responsible for issuing a combined broadcast message including all object moves from all host computers. Since the broadcast messages are sent periodically and not in real time on each object move, the use of a single central updating computer will not necessarily lead to bottleneck. In this case, on each object move, in addition to immediately transmitting the location update message to the host computers logged as accessing that object, the location update message is also sent to the central computer to compile the periodic broadcast location update composite message.

Naturally, applications other than telecommunications are possible, such as for example shared distributed computing or shared virtual simulations.

Many other alternatives and modifications will be apparent to the skilled person. Accordingly, the present invention is intended to encompass any and all subject matter disclosed herein, whether or not covered by the accompanying claims.

What is claimed is:

1. A computing system comprising a plurality of computers interconnected by a data communication network, each storing a plurality of data records, each being programmed to access a record held on another, each being programmed to move a record to another said computer, in which each computer is arranged to store a table of data storing, for all records on all said computers, data indicating the computer on which that record may currently be stored, and to update that table when a said record is moved, in which each said computer is arranged to store, for each said record held thereon, a log of the identities of other computers which have accessed that record and is arranged, on moving a said record, to send a location updating message to at least one further said computer determined in accordance with that log, and in which each said computer is further arranged to send said location updating message at a later time to at least one further said host computer which is not determined in accordance with said log.

2. A system according to claim 1 in which said later time comprises a periodically recurring time.

3. A computing system according to claim 1 arranged to control a telecommunications network.

4. A computing system according to claim 3, in which said records comprise records each storing data relating to a corresponding telephone subscriber.

5. A computing system according to claim 3, in which said records comprise records each storing data relating to a corresponding telephone terminal device.

6. A computing system according to claim 3, in which said records comprise records each storing data relating to a corresponding telephone routing device.

7. A method of moving a data record from a first computer to a second within a distributed computer network comprising a plurality of further computers, comprising the step of determining which of said plurality have accessed said record, and selectively transmitting a location update message to a subset of said plurality in accordance with said determining, and further comprising transmitting said location update message to further computers of said plurality not within said subset, at a later time than the selective transmission to said subset.

8. A method according to claim 7 in which said later transmission comprises a message including location update data for multiple said records.

9. A method according to claim 7 in which said later time is a periodically recurring time.

\* \* \* \* \*